United States Patent
Lustig et al.

(10) Patent No.: US 10,319,961 B2
(45) Date of Patent: Jun. 11, 2019

(54) ENERGY STORAGE CELL AND ENERGY STORAGE MODULE

(71) Applicant: Bayerische Motoren Werke Aktiengesellschaft, Munich (DE)

(72) Inventors: Robert Lustig, Munich (DE); Florian Engel, Munich (DE); Jens Vetter, Hebertshausen (DE); Andreas Schleicher, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 314 days.

(21) Appl. No.: 14/689,598

(22) Filed: Apr. 17, 2015

(65) Prior Publication Data
US 2015/0221906 A1 Aug. 6, 2015

Related U.S. Application Data

(63) Continuation of application No. PCT/EP2013/069194, filed on Sep. 17, 2013.

(30) Foreign Application Priority Data

Oct. 18, 2012 (DE) .................. 10 2012 218 991

(51) Int. Cl.
*H01M 2/30* (2006.01)
*H01M 2/10* (2006.01)
(Continued)

(52) U.S. Cl.
CPC ......... *H01M 2/1016* (2013.01); *H01M 2/024* (2013.01); *H01M 2/0292* (2013.01);
(Continued)

(58) Field of Classification Search
CPC .. H01M 10/6553; H01M 10/647; H01M 2/26; H01M 2/305
See application file for complete search history.

(56) References Cited

U.S. PATENT DOCUMENTS 6,294,287 B1    9/2001  Lee et al.
7,192,671 B2 *  3/2007  Hashimoto ............ H01M 2/06
                                                    429/163
(Continued)

FOREIGN PATENT DOCUMENTS

CN      1370332 A    9/2002
CN      1449067 A   10/2003
(Continued)

OTHER PUBLICATIONS

Chinese Office Action issued in counterpart Chinese Application No. 201380043028.7 dated May 4, 2016 with partial English translation (11 pages).

(Continued)

*Primary Examiner* — Ula C Ruddock
*Assistant Examiner* — Thomas H. Parsons
(74) *Attorney, Agent, or Firm* — Crowell & Moring LLP

(57) ABSTRACT

An energy storage cell includes an electrically conductive housing having at least one first, one second, and one third outer wall, with the first outer wall being located at a distance from the second outer wall, and with the third outer wall connecting the first and second outer walls to one another. At least one electrochemical element is disposed in the housing having one anodic connection and one cathodic connection. An anodic current tap on the first outer wall is connected to the anodic connection in an electrically conductive fashion, and a cathodic current tap is connected in an electrically conductive fashion to the first or third outer wall. The cathodic connection is connected in the interior of the housing to the second outer wall in an electrically and thermally conductive fashion.

11 Claims, 1 Drawing Sheet

(51) Int. Cl.
- *H01M 2/02* (2006.01)
- *H01M 2/26* (2006.01)
- *H01M 10/625* (2014.01)
- *H01M 10/6553* (2014.01)
- *H01M 10/647* (2014.01)
- *H01M 10/6556* (2014.01)
- *H01M 10/6554* (2014.01)
- *H01M 10/613* (2014.01)
- *H01M 10/6551* (2014.01)
- *H01M 10/052* (2010.01)

(52) U.S. Cl.
CPC .......... *H01M 2/1077* (2013.01); *H01M 2/26* (2013.01); *H01M 2/305* (2013.01); *H01M 10/613* (2015.04); *H01M 10/625* (2015.04); *H01M 10/647* (2015.04); *H01M 10/6551* (2015.04); *H01M 10/6553* (2015.04); *H01M 10/6554* (2015.04); *H01M 10/6556* (2015.04); *H01M 10/052* (2013.01); *H01M 2220/20* (2013.01)

(56) References Cited

U.S. PATENT DOCUMENTS

| | | |
|---|---|---|
| 2003/0186113 A1 | 10/2003 | Hashimoto et al. |
| 2004/0137322 A1 | 7/2004 | Hong et al. |
| 2006/0046135 A1 | 3/2006 | Huang |
| 2010/0323235 A1 | 12/2010 | Takami et al. |
| 2012/0177960 A1* | 7/2012 | Tasai .............. B60H 1/00278 429/72 |
| 2013/0078500 A1 | 3/2013 | Takami et al. |

FOREIGN PATENT DOCUMENTS

| | | |
|---|---|---|
| CN | 101048896 A | 10/2007 |
| CN | 101960650 A | 1/2011 |
| CN | 202167571 * | 3/2012 |
| CN | 102593549 A | 7/2012 |
| DE | 10 2008 059 956 B4 | 9/2012 |
| EP | 2 104 121 A1 | 9/2009 |
| JP | 2003-297413 A | 10/2003 |
| JP | 2009-211936 A | 9/2009 |
| JP | 2010-62130 A | 3/2010 |
| WO | WO 01/13448 A1 | 2/2001 |
| WO | WO 02/17414 A2 | 2/2002 |
| WO | WO 2009/110484 A1 | 9/2009 |

OTHER PUBLICATIONS

Chinese Office Action issued in counterpart Chinese Application No. 201380043028.7 dated Dec. 23, 2016 with English translation (six pages).
International Search Report (PCT/ISA/210) dated Nov. 4, 2013 with English translation (seven pages).
German Search Report dated Oct. 26, 2012 with partial English translation (10 pages).
Chinese Office Action issued in counterpart Chinese Application No. 201380043028.7 dated Jun. 14, 2017 with English translation (13 pages).
Chinese-language Office Action issued in counterpart Chinese Application No. 201380043028.7 dated Oct. 24, 2017 with English translation (10 pages).
German-language Japanese Office Action issued in counterpart Japanese Application No. 2015-537176 dated Aug. 15, 2017 (Eight (8) pages).

* cited by examiner

ENERGY STORAGE CELL AND ENERGY STORAGE MODULE

CROSS REFERENCE TO RELATED APPLICATIONS

This application is a continuation of PCT International Application No. PCT/EP2013/069194, filed Sep. 17, 2013, which claims priority under 35 U.S.C. § 119 from German Patent Application No. 10 2012 218 991.2, filed Oct. 18, 2012, the entire disclosures of which are herein expressly incorporated by reference.

BACKGROUND AND SUMMARY OF THE INVENTION

The present invention relates to an energy storage cell as well as to an energy storage module in which a plurality of the energy storage cells are combined. The energy storage cell and the energy storage module are particularly used to supply energy to the drive mechanism of a motor vehicle.

Conventional energy storage cells generally comprise a housing in which the at least one electrochemical element is accommodated. The electrochemical element in the interior of the housing has one anodic connection and one cathodic connection. These two connections are guided outward through the housing and connected to a corresponding anodic and cathodic current tap outside of the housing. The housing usually has a cup-shaped base body, known as the "can." This cup-shaped base body is closed by use of a cover, known as the "cap." The anodic and cathodic current taps are located on this cap.

The object of the present invention is to provide an energy storage cell and an energy storage module that may be produced and installed in a cost-effective manner and operated in a low-maintenance, reliable, and efficiency-optimized manner. In particular, the object of the present invention is to provide an energy storage cell and associated energy storage module in which heat from the electrochemical elements may be effectively discharged to the outside.

These and other objects are achieved according to the invention by an energy storage cell comprising an electrically conductive housing, at least one electrochemical element disposed in the housing, an anodic current tap, and a cathodic current tap. The electrochemical element is disposed in the interior of the housing. This element comprises an anodic connection and a cathodic connection. The anodic current tap is located on the exterior of the housing and is directly connected to the anodic connection of the electrochemical element through the housing. The cathodic current tap is also located on the exterior of the housing but is not directly connected to the cathodic connection of the electrochemical element.

According to the invention, the cathodic connection is in contact with the interior of the housing. In turn, the cathodic current tap is also in contact with the housing, such that the current from the cathodic connection is conducted via the electrically conductive housing to the cathodic current tap.

The housing comprises at least three outside walls. The first outer wall is located at a distance from the second outer wall and the third outer wall is disposed in such a way that it closes off the housing and, at the same time, connects the first outer wall to the second outer wall. The anodic current tap is disposed on the first outer wall. The cathodic current tap is either also disposed on the first outer wall or on the third outer wall. In the interior of the housing, the cathodic connection is connected to the second outer wall in an electrically and thermally conductive manner.

The cathodic connection in the interior of the housing, which connects the electrochemical elements to the second outer wall, performs two functions at the same time: the current flow from the electrochemical element via the housing to the cathodic current tap is guaranteed. At the same time, the cathodic connection serves as a direct and very thermally conductive connection between the electrochemical element and the second outer surface. According to the invention, therefore, the heat produced in the electrochemical element can be directly discharged to the second outer surface of the housing via a metal element, namely the cathodic connection. At the same time, the invention ensures that no current tap is located on the second outer surface. For this reason, the second outer surface of the housing may be optimally used for cooling the energy storage cell. The energy storage cell is preferably used in a motor vehicle and is used there for the sole drive or supporting drive of the motor vehicle via an electric motor.

The energy storage cell according to the invention allows the current taps to be disposed on the various outer walls of the housing in a very flexible manner. Thus, the energy storage cells may be combined in various ways to form modules, resulting in a very modular and space-saving structure. At the same time, by virtue of the optimal cooling, the energy storage cells may be operated in a reliable and efficiency-optimized manner. This application will mostly discuss the cooling of the energy storage cells. Naturally, however, it is also possible for heat to be supplied via the second outer wall and the cathodic connection.

It is advantageous for the first outer wall of the housing to at least partially be comprised by a cap. The anodic current tap is preferably disposed on the cap. It is particularly preferred for the cathodic current tap also to be located on the cap. The cap is particularly designed to be large enough that the electrochemical element may be placed in the housing via the corresponding opening. When the cathodic current tap is disposed on the cap, the cap must be at least partially electrically conductive and connected to the rest of the housing in an electrically conductive fashion.

It is advantageous for the housing to have a prismatic design, such that a plurality of energy storage cells may be aligned in a very space-saving fashion. In particular, this is a cuboid structure, with the first outer wall being disposed parallel to the second outer wall. In the case of a cylindrical design of the housing, the first and second outer walls are likewise disposed parallel and at a distance from one another, with the third outer wall forming the shell.

The exterior surface of the second outer wall is preferably electrically insulated. Here, a film is preferably used for insulation. The film should have an extremely thin design that is as thermally conductive as possible. According to the invention, the cooling unit is placed against the second outer wall. Because cooling units are usually made of metal materials, it is advantageous for an electrical insulation to be present between the cooling unit and the second outer wall.

The invention further relates to an energy storage module, in particular for a motor vehicle. The energy storage module comprises at least one of the energy storage cells described above. Any advantageous embodiments discussed in the context of the energy storage cells are correspondingly applicable to the energy storage module as well. Moreover, the energy storage module comprises a cooling unit having a heat transfer surface. This heat transfer surface of the cooling unit rests flush against the second outer wall of the energy storage cell. The advantageous electrical insulation by use of the film is preferably disposed between the heat transfer surface and the second outer wall.

Preferably, a plurality of the energy storage cells are disposed stacked one against the other, with the heat transfer surface of a common cooling unit resting against the plurality of second outer walls of the multiple energy storage cells, such that one cooling unit may be used for multiple energy storage cells.

A fluid conduction device is preferably disposed in the cooling unit. By means of this fluid conduction device, it is possible for the heat from the heat transfer surface to be conducted away toward the outside via the corresponding fluid.

The energy storage cell is preferably embodied as a lithium-ion battery.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
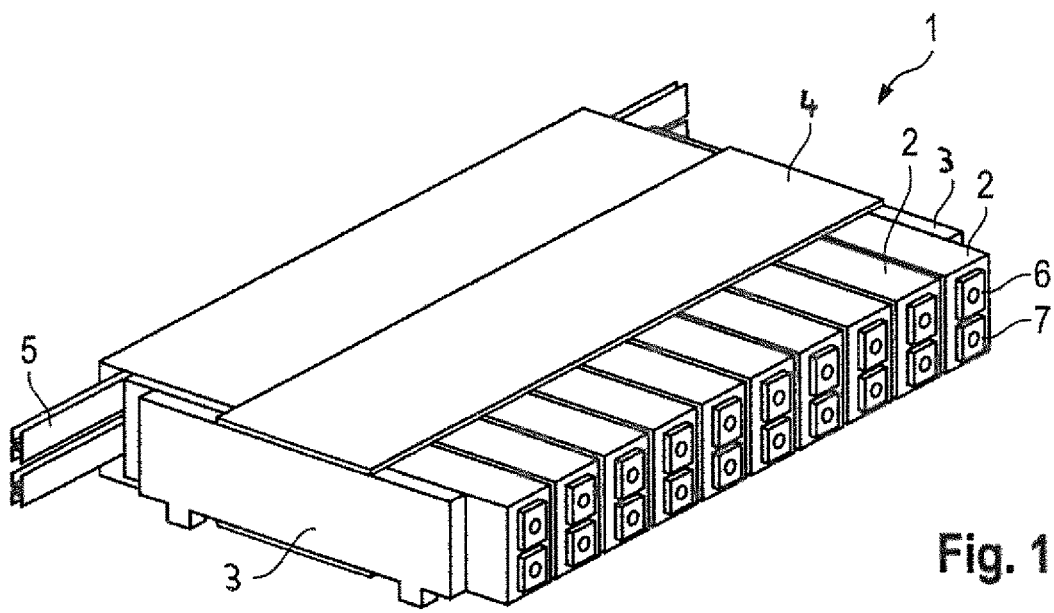
FIG. 1 is a perspective view of an energy storage module according to an embodiment of the invention having a plurality of energy storage cells.
Figure 2:
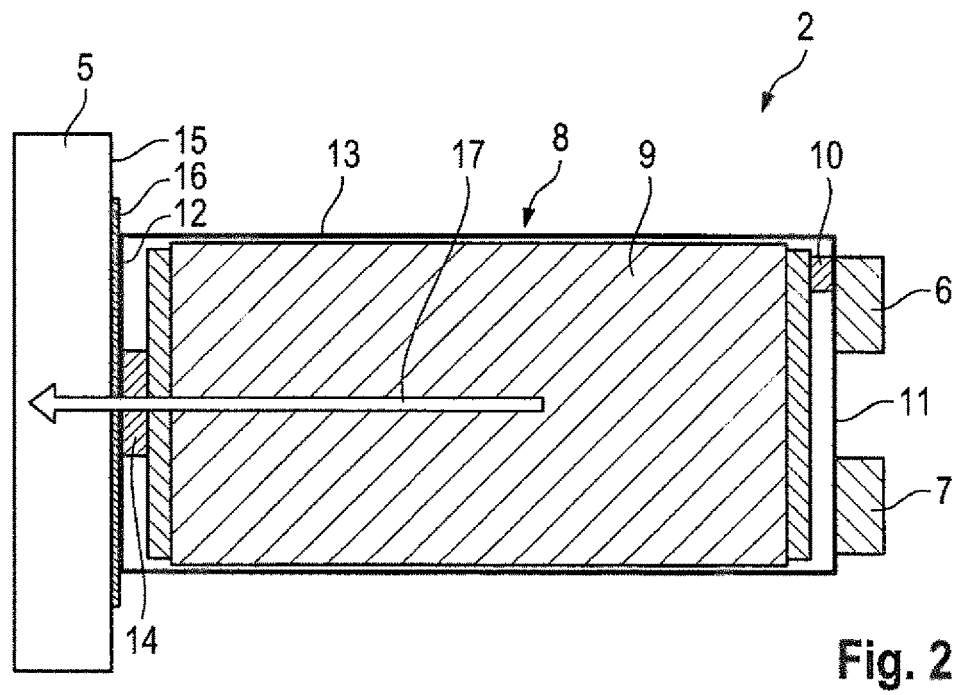
FIG. 2 is a schematic sectional view of the energy storage module according to the exemplary embodiment of the invention.

With reference to FIGS. 1 and 2, an exemplary embodiment of an energy storage module 1 will be discussed in the following. A plurality of energy storage cells 2 are combined in the energy storage module 1. The energy storage module 1 shown here serves to supply power to an electrical drive in a motor vehicle.

As is shown in FIG. 1, a plurality of prismatic energy storage cells 2 are stacked in a row one adjacent to the other in the energy storage module 1. The stack of energy storage cells 2 is held together by pressure plates 3 and tension anchors 4. Here, the tension anchors 4 connect the pressure plates 3.

One anodic current tap 6 and one cathodic current tap 7 are embodied on each energy storage cell 2. In addition, the energy storage module 1 includes a common cooling unit 5. This cooling unit 5 rests adjacent to the rear of all energy storage cells 2.

FIG. 2 shows a simplified schematic view of a section through the energy storage module 1. Here, the section is placed through one of the energy storage cells 2.

As is shown in FIG. 2, the energy storage cell 2 includes a housing 8. The housing 8 is formed by one first outer wall 11, one second outer wall 12, and one third outer wall 13. The energy storage cell 2 shown here has a cuboid design, such that the third outer wall 13 is formed by four outer surfaces. The first outer wall 11 is designed as a cover and closes off the housing 8.

An electrochemical element 9 is disposed in the interior of the housing 8. The electrochemical element 9 is constructed in a wound fashion. One anodic connection 10 and one cathodic connection 14 are located on the electrochemical element 9.

The anodic connection 10 extends through the first outer wall 11 and is connected to the anodic current tap 6 in an electrically conductive fashion. The cathodic current tap 7 is located on the first outer wall 11 along with the anodic current tap 6. However, the cathodic connection 14 is not directly connected to the cathodic current tap 7.

As FIG. 2 shows, the cathodic connector 14 is directly connected to the second outer wall 12 of the housing 8. Because the housing 8 is embodied in an electrically conductive fashion, the current flows from the cathodic connection 14, through the housing, via the third outer wall 13 in the example shown here, to the cathodic current tap 7.

The second outer wall 12 of the housing 8 rests directly on and flush against a heat transfer surface 15 of the cooling unit 5. Between the second outer wall 12 and the heat transfer surface 15, only a very thin film 16 is disposed for electrical insulation.

The connection 14 represents a direct thermal connection between the electrochemical element 9 and the second outer wall 12. Thus, it is possible for the heat to be discharged from the electrochemical element 9 by way of the cooling unit 5 in an extremely effective fashion. The resulting heat path is drawn in schematically with the reference character 17.

At the same time as this optimal heat path 17, the direct contact of the housing 8 via the cathodic connection 14 allows the cathodic current tap 7 to be placed in almost any desired spot on the surface of the housing 8.

LIST OF REFERENCE CHARACTERS

1 Energy storage module
2 Energy storage cell
3 Pressure plate
4 Tension anchor
5 Cooling unit
6 Anodic current tap
7 Cathodic current tap
8 Housing
9 Electrochemical element
10 Anodic connection
11 First outer wall
12 Second outer wall
13 Third outer wall
14 Cathodic connection
15 Heat transfer surface
16 Film
17 Heat transfer path The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy storage cell, comprising:
   an electrically conductive housing having at least one first, one second, and one third outer wall, with the first outer wall being located at a distance from the second outer wall, and with the third outer wall connecting the first and second outer walls to one another;
   at least one electrochemical element disposed in the housing, the electrochemical element having an anodic connection and a cathodic connection,
   an anodic current tap disposed on the first outer wall, wherein the anodic connection extends through the first outer wall and is directly connected to the anodic current tap in an electrically conductive fashion, and a cathodic current tap connected to the first or third outer wall in electrically conductive fashion, wherein
the cathodic connection is connected in an interior of the housing to the second outer wall in an electrically and thermally conductive manner.

2. The energy storage cell according to claim 1, wherein the first outer wall of the housing is at least partially formed by a cap of the housing, with the anodic current tap being disposed on the cap.

3. The energy storage cell according to claim 2, wherein the cathodic current tap is disposed on the cap.

4. The energy storage cell according to claim 1, wherein the housing is configured in a prismatic fashion.

5. The energy storage cell according to claim 4, wherein the prismatic fashion is cuboid.

6. The energy storage cell according to claim 1, wherein the first outer wall is disposed parallel to the second outer wall.

7. The energy storage cell according to claim 1, wherein an outer surface of the second outer wall is electrically insulated, via a film.

8. An energy storage module for a motor vehicle, comprising:
at least one energy storage cell, the at least one energy storage cell comprising;
an electrically conductive housing having at least one first, one second, and one third outer wall, with the first outer wall being located at a distance from the second outer wall, and with the third outer wall connecting the first and second outer walls to one another;
at least one electrochemical element disposed in the housing, the electrochemical element having an anodic connection and a cathodic connection;
an anodic current tap disposed on the first outer wall, wherein the anodic connection extends through the first outer wall and is directly connected to the anodic current tap in an electrically conductive fashion; and
a cathodic current tap connected to the first or third outer wall in electrically conductive fashion, wherein the cathodic connection is connected in an interior of the housing to the second outer wall in an electrically and thermally conductive manner; and
a cooling unit having a heat transfer surface, wherein the heat transfer surface rests against the second outer wall of the energy storage cell.

9. The energy storage module according to claim 8, wherein a plurality of the energy storage cells are stacked together, with the heat transfer surface of the one cooling unit resting against the second outer walls of the plurality of energy storage cells.

10. The energy storage module according to claim 9, wherein a fluid conduction device in the cooling unit conducts heat away from the heat transfer surface.

11. The energy storage module according to claim 8, wherein a fluid conduction device in the cooling unit conducts heat away from the heat transfer surface.

* * * * *